M. P. HOLMES.
CLUTCH CONTROLLING MECHANISM.
APPLICATION FILED JUNE 5, 1916.
1,347,811.
Patented July 27, 1920.
2 SHEETS—SHEET 2.
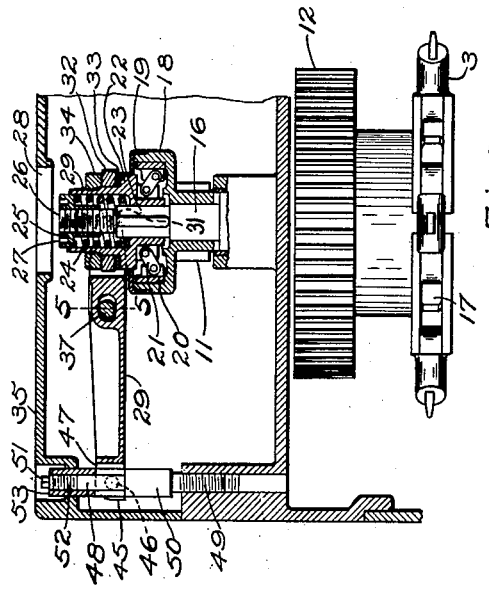
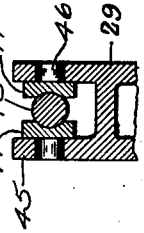
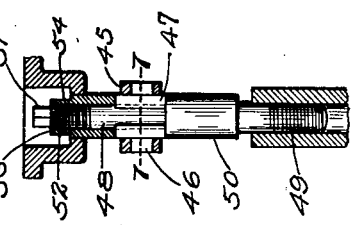
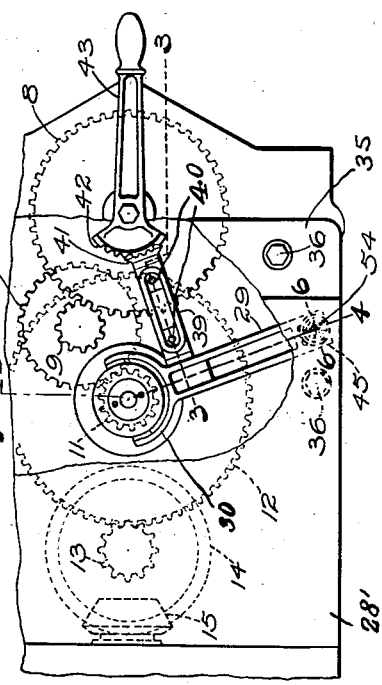
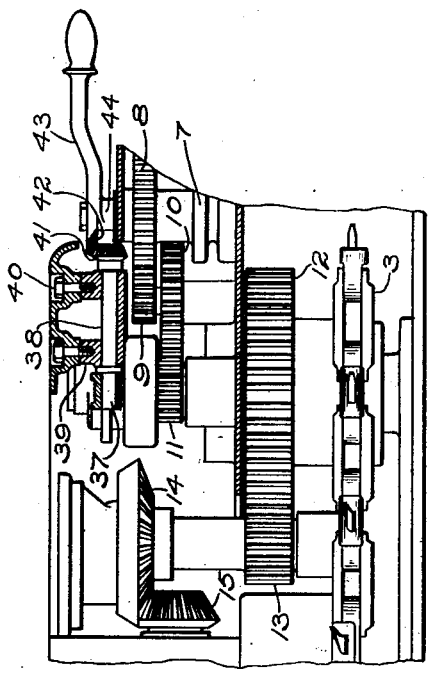
Inventor
Morris P. Holmes
By Horace L. _____
Atty

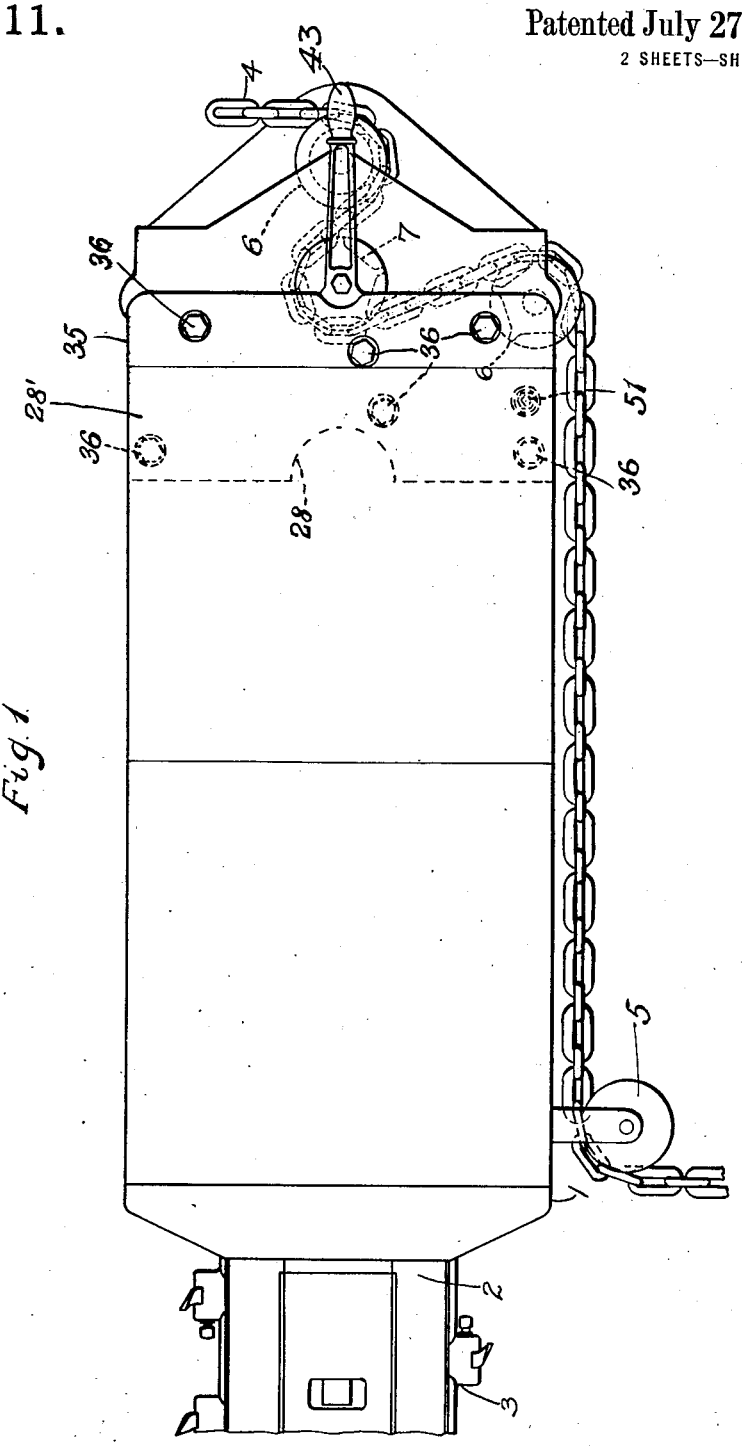

UNITED STATES PATENT OFFICE.

MORRIS P. HOLMES, OF CLAREMONT, NEW HAMPSHIRE, ASSIGNOR, BY MESNE ASSIGNMENTS, TO JEFFREY MANUFACTURING COMPANY, OF COLUMBUS, OHIO, A CORPORATION OF OHIO.

CLUTCH-CONTROLLING MECHANISM.

1,347,811.             Specification of Letters Patent.      Patented July 27, 1920.

Application filed June 5, 1916. Serial No. 101,727.

*To all whom it may concern:*

Be it known that I, MORRIS P. HOLMES, a citizen of the United States, residing at Claremont, in the county of Sullivan and State of New Hampshire, have invented certain new and useful Improvements in Clutch-Controlling Mechanisms, of which the following is a full, clear, and exact specification.

My invention relates to clutch controlling mechanisms.

It has among its objects to provide improved means whereby a clutch mechanism may be readily and conveniently adjusted. A more specific object of my invention is to provide improved means whereby the friction clutch controlling the feeding mechanism of a mining machine may be adjusted without requiring the removal of the gear cover as has heretofore been necessary, and without providing an opening therein through which dust may enter the machine. These and other objects of my improved construction will hereinafter appear.

In the accompanying drawings, I have for purposes of illustration shown one embodiment which my invention may assume in practice, the same being illustrated in connection with a mining machine.

In these drawings:—

Figure 1 is a plan view of a mining machine of the continuous cutter type equipped with my improvement.

Fig. 2 is a detail plan view of a portion of the same machine with the top cover plate and gear cover broken away and the chain and other parts omitted to facilitate illustration, the gearing being indicated in dotted lines.

Fig. 3 is a side elevation, partially in vertical section, of the transmission mechanism and the friction controlling mechanism, the section being taken on line 3—3 of Fig. 2.

Fig. 4 is a detail sectional view of the machine taken on line 4—4 of Fig. 2, showing the construction of the friction mechanism and its controlling mechanism, the top cover plate and certain parts of the transmission mechanism being omitted to facilitate illustration.

Fig. 5 is a detail sectional view taken on line 5—5 of Fig. 4, showing the cam or eccentric for the friction controlling mechanism.

Fig. 6 is an enlarged detail sectional view taken on line 6—6 of Fig. 2, showing the adjusting mechanism for the friction controlling member.

Fig. 7 is a detail sectional view taken on line 7—7 of Fig. 6.

In these drawings, I have illustrated a mining machine of a standard type including a bed-like frame 1 carrying a cutter bar 2 which is provided with a cutter chain 3, the machine being adapted to be fed into or along the face of the coal by means of a feed chain 4 connected at its ends to suitable supports in front of the face and moving around suitable guiding members 5 and 6 at the front and rear of the machine, the latter being fed along the chain by a suitable driving member 7 which is in turn driven in a well known manner from a motor (not shown) through suitable gearing, a simplified form of one-speed gearing 8, 9, 10, 11, 12, 13, 14, 15, used for moving the machine about the mine being shown herein, and the gearing used during cutting being omitted to facilitate illustration.

In order to control the connection of the feed chain driving member 7 to the motor, a friction clutch is usually provided. In the illustrative embodiment of my invention shown herein, this clutch controls the connection of the freely rotatable gear 11 to a rotatable shaft 16 carrying the gear 12, this shaft as shown herein also preferably acting as the shaft on which the inner sprocket 17 for the cutter chain is carried. As illustrated, the gear 11 is preferably provided at its upper end with an integral cup 18, suitably sealed against the entry of dust or the like by a cover 19, which cup carries within the same a friction band 20 expandable by a plurality of toggle members 21 connected thereto and at their inner ends to a reciprocable centrally located controlling member 22 splined to the shaft 16. As shown, this controlling member 22 is vertically movable on a reduced portion 23 of the shaft 16 to control the band 20, and is suitably bored to receive a coiled spring 24 and a nut 25 which controls the compression of the spring, the nut being adjustable up and down on an upstanding threaded member 26, preferably carried by the reduced portion 23 of the shaft, and also preferably being provided with a plurality of pin-holes or suitable openings 27 therein, disposed below a suitable opening 28 in the gear cover hereinafter mentioned, so that it may be readily adjusted when desired.

Coöperating with the reciprocating member 22 and pivotally connected thereto, is a friction adjusting lever 29. As shown, this member is provided with jaws 30 which surround one side of the member 22 and are pivotally connected to laterally extending pins 31 carried on a ring 32, which is in turn carried on the member 22 and clamped in position against a washer 33 thereon by a threaded holding ring 34. This lever 29 extends substantially transversely across the top of the frame and beneath the usual gear cover plate 35 which is clamped in position on the frame by a plurality of bolts 36 and overlapped by the usual snug fitting removable top cover plate 28'. As shown, this lever 29, at a point intermediate its ends and preferably slightly nearer its inner end, is mounted on a cam or eccentric 37 preferably formed integral with a shaft 38 which is in turn journaled in a suitable depending bracket 39 preferably clamped to the top of the casing by screws 40. Fig. 3. As shown, this shaft 38 extends rearwardly and the opposite end of the same from the eccentric 37 preferably has fixed thereto a beveled gear 41 meshing with a suitable arcuate rack 42 formed on the front end of an operating lever 43 which is pivoted at 44 on the upper part of the frame and extends rearwardly therefrom and outside the casing into a convenient position for operation by an operator located at the rear or side of the machine.

This lever 29 also extends laterally past its point of connection to the cam or eccentric 37 and over to one side of the casing where its outer end is provided with parallel arms 45 pivoted on pins or swivels 46 formed on oppositely disposed removable members 47. As shown, these members 47 have longitudinal grooves in their adjacent faces adapted to receive a vertical pin 48, the members 47 being adapted to be placed in position between the arms 45 prior to the insertion of the pin 48. This pin is in turn preferably threaded at its lower end at 49 into a suitable threaded recess in the side wall of the frame, and is also preferably provided with a suitable shoulder portion 50 disposed below the members 47. As shown, the upper end of this pin 48 is also provided with a square or otherwise suitably formed nut-like extremity 51 whereby it may be rotated to vary its position of vertical adjustment with respect to the frame, and thereby raise the end of the member 29 to which it is connected. It will also be noted that the upper end of this pin 48 is also threaded, as shown at 52, and surrounded by a locking nut 53 likewise provided with a square or otherwise suitably formed nut-like end 54 so that it may be adjusted to hold the members 47 in any desired position of adjustment thereof, the lower end of the member 53 preferably also engaging the upper surface of the members 47 so that the latter may be securely clamped in position.

In the use of my improved construction, the clutch is of course normally operated in a well known manner by movement of the lever 43, the inner end of the member 29 being alternately raised and lowered to move the same about its pivot 46. It will be noted, however, that whenever it is desired to adjust the friction mechanism, as when wear or the like has taken place, this may be readily accomplished by manipulating the holding nut 53 in such a manner as to release the member 48, whereupon the latter, by turning its squared end 51, may be raised or lowered as desired to adjust the pivot of the member 29 as desired. When this adjustment has taken place, the member 53 may obviously again be tightened without interfering with the adjustment of the member 48, and will act to hold that member and the member 29 in any desired position of adjustment. In practice, it has been found convenient in making these adjustments to use a plurality of wrenches, one of which is to release and tighten the member 51, while the other is for adjusting the member 53, as by the use of these wrenches one member may be readily adjusted while the other is held against movement. Of course it will be understood that this adjustment of the member 29 does not interfere in any way whatsoever with the operation of the friction mechanism through the lever 43 and eccentric 37, and that the tension of the spring of the friction may be adjusted whenever desired by suitable rotation of the nut 25, all in a well known manner.

It will be noted that in my improved construction it is possible to adjust the friction to compensate for wear or the like whenever desired, from the exterior of the casing, and in a relatively short time, as it is entirely unnecessary to remove the large number of bolts which are necessarily required to clamp the gear cover in position, the parts to be adjusted instead being readily accessible when only the top cover 28' is lifted. It will also be noted that the parts are securely held in each position of adjustment, and that through the simplicity of the means provided, a relatively unskilled operator may adjust the parts with nicety. Attention is also directed to the fact that although the clutch actuating mechanism is accessible from the exterior of the casing, the latter is normally sealed to prevent the entry of dust or the like to the working parts of the machine. These and other advantages of my improved construction will, however, be clearly apparent to those skilled in the art.

While I do not herein specifically claim any particular form of top cover for preventing the accidental entry of foreign objects through vertical passage-ways such as that at 28 or that shown in Fig. 3 in front of the gear cover or inner plate 35, it is to be understood that a suitable cover of any preferred form can be used. In Fig. 2 both the gear cover and the top plate are shown broken away.

While I have in this application specifically described one embodiment which my invention may assume in practice, it is to be understood that the form thereof shown herein is used for purposes of illustration, and that the invention may be modified and embodied in other forms without departing from its spirit, it being my intention to include all such modifications within the scope of the appended claims.

What I claim as new and desire to secure by Letters Patent is:—

1. In an apparatus of the class described, the combination of a clutch mechanism, a clutch controlling mechanism, a casing inclosing the same, means operable from the exterior of said casing for operating the clutch including an elongated, pivoted, non-rotary lever member positioned within the casing and extended to points beyond the lines of rotation of the clutch, and coöperating means manually operable from the exterior of said casing for adjusting the pivot of said lever member while the clutch is rotating.

2. In an apparatus of the class described, a clutch mechanism, a clutch controlling mechanism, a casing inclosing the same and having an aperture therein, means for operating said clutch mechanism from the exterior of said casing including a pivoted lever member positioned within the casing and extended radially to, and having a stationary fulcrum pivot at, a point outside of the lines of rotation of the clutch, and coöperating means normally closing said aperture for adjusting the fulcrum pivot of said lever member.

3. In a clutch controlling mechanism, clutch mechanism, means including a cover inclosing the same and having a plurality of apertures therein, means for operating said clutch mechanism from the exterior of said cover, means for adjusting said clutch mechanism through one of said apertures, and coöperating means for regulating said clutch operating means normally closing the other aperture in said casing.

4. In an apparatus of the class described, a clutch mechanism including a movable clutch member, a clutch controlling mechanism including a lever connected to said movable clutch member and mounted at its outer end on a normally stationary adjustable pivot fulcrum, a casing inclosing said elements, means connected to said lever and operable from the exterior of said casing for actuating it, and means for adjusting the fulcrum pivot of said lever from the exterior of said casing.

5. In a clutch controlling mechanism, clutch mechanism including a movable member, a pivoted actuating lever connected at one end to said movable member, a casing inclosing said elements, means connected to said lever at a point intermediate its ends and operable from the exterior of the casing for operating said lever, and means for adjusting the pivot of said pivoted lever from the exterior of said casing.

6. In combination, a frame, gearing thereon, a gear cover disposed over said gearing, means for attaching said cover to said frame, a controlling device for said gearing adjustable without removal of said gear cover, means operable from the exterior of said frame for operating said controlling device, and supplemental means adjustable without removal of said gear cover for regulating said operating means.

7. In combination, a frame, gearing thereon, a gear cover disposed over said gearing, means for attaching said cover to said frame, a frictional controlling device for said gearing adjustable without removal of said gear cover, means operable from the exterior of said frame for operating said controlling device, and supplemental means adjustable without removal of said gear cover for adjusting the range of movement of said operating means.

8. In a clutch controlling mechanism, clutch mechanism including a movable member, a pivoted lever connected at one end to said member, a cam member engageable with said lever at a point intermediate its ends, a casing inclosing said elements, means for operating said cam member from the exterior of said casing, and means for varying the effect of a given movement of said cam member from the exterior of said casing.

9. In a clutch controlling mechanism, clutch mechanism including a movable member, a pivoted lever connected at one end to said member, a cam member engageable with said lever at a point intermediate its ends, a casing inclosing said elements, means for operating said cam member from the exterior of said casing, means for adjusting the position of the pivot of said lever from the exterior of said casing, and locking means for said last mentioned means.

10. In a clutch controlling mechanism, clutch mechanism including a movable member, a pivoted lever connected at one end to said member, a cam member engageable with said lever at a point intermediate its ends, a casing inclosing said elements, means for operating said cam member from the exterior of said casing, means for varying the effect of a given movement of said cam member from the exterior of said casing including an adjustable member on which said lever is pivoted, and means operable from the exterior of said casing for holding said adjustable member in any desired position of adjustment.

11. In a clutch controlling mechanism, clutch mechanism including a movable member, a pivoted lever connected to said movable clutch member at one end, a casing inclosing said elements, means engageable with said lever at a point intermediate its ends and operable from the exterior of said casing for actuating said lever, an adjusting member on which said lever is pivoted having one end extending through an aperture in said casing, and holding means for said adjusting member seated in said aperture and operable from the exterior of said casing.

12. The combination with a friction clutch mechanism including a clutch member, an expansible member engageable therewith, toggle mechanism connected to said expansible member, and a spring pressed reciprocable member connected to said toggle mechanism; of a pivoted lever operatively connected to said reciprocable member at one end, a casing inclosing the above mentioned elements, means for raising and lowering the end of said lever connected to said reciprocable member, and means operable from the exterior of said casing for adjusting the elevation of the pivot of said lever.

13. The combination with a machine casing, of driving and driven mechanisms rotatably mounted therein, a clutch for operatively connecting said mechanisms, means operable from the exterior of said casing for operating said clutch, said means including a member within said casing mounted on a stationary pivot, and coöperating means operable from the exterior of said casing for adjusting the pivot of said member while the clutch is rotating.

14. In a mining machine, a machine casing, feeding mechanism including transmission mechanism within said casing, said transmission mechanism including a clutch, means operable from the exterior of said casing for operating said clutch, said means including a pivoted member within said casing, and coöperating means operable from the exterior of said casing for adjusting the pivot of said member.

15. In a mining machine, a bed frame, a shaft thereon, feeding mechanism for said machine including a feed chain driving member, transmission mechanism between said shaft and feed chain driving member including a gear, clutch mechanism controlling the connection of said gear to said shaft and including a movable clutch member, means for controlling said clutch including a pivoted lever operatively connected to said movable clutch member, a casing or cover plate extending over said clutch, and means for adjusting the pivot of said lever from the exterior of said cover plate.

16. In a mining machine, a bed frame, a shaft thereon, feeding mechanism for said machine including a feed chain driving member, transmission mechanism between said shaft and feed chain driving member including a gear, clutch mechanism controlling the connection of said gear to said shaft and including a movable clutch member, means for controlling said clutch including a pivoted lever operatively connected to said movable clutch member, a casing or cover plate extending over said clutch and having an aperture therein, and means normally sealing the aperture in said cover plate operable to adjust the pivot of said lever from the exterior of said cover plate and lock said pivot in each position of adjustment.

In testimony whereof I affix my signature.

MORRIS P. HOLMES.